United States Patent [19]

Neugebauer et al.

[11] Patent Number: 4,923,953

[45] Date of Patent: May 8, 1990

[54] MOLDING COMPOUNDS COMPRISING A THERMOPLASTICALLY PROCESSIBLE, AROMATIC POLYESTER IMIDE

[75] Inventors: Wolfgang Neugebauer, Duelmen-Merfeld; Heinz-Guenter Poll, Marl, both of Fed. Rep. of Germany

[73] Assignee: Huels Aktiengesellschaft, Marl, Fed. Rep. of Germany

[21] Appl. No.: 318,827

[22] Filed: Mar. 6, 1989

[30] Foreign Application Priority Data

May 13, 1988 [DE] Fed. Rep. of Germany ....... 3816402

[51] Int. Cl.$^5$ .................. C08G 8/20; C08G 63/02
[52] U.S. Cl. .................. 528/170; 528/125; 528/128; 528/193
[58] Field of Search .............. 528/125, 128, 170, 193

[56] References Cited

U.S. PATENT DOCUMENTS

| | | | |
|---|---|---|---|
| 4,383,105 | 5/1983 | Irwin | 528/170 |
| 4,760,124 | 7/1988 | Matsumura | 528/170 |
| 4,762,906 | 8/1988 | Hisgen et al. | 528/170 |
| 4,788,272 | 11/1988 | Hisgen et al. | 528/170 |
| 4,801,676 | 1/1989 | Hisgen et al. | 528/170 |

Primary Examiner—John Kight, III
Assistant Examiner—T. Mosley
Attorney, Agent, or Firm—Oblon, Spivak, McClelland, Maier & Neustadt

[57] ABSTRACT

Molding compounds which contain a thermoplastically processible aromatic polyester imide prepared by polymerizing: (A) 0 to 70 mole % of HO-Ar-COOH; (B) 0 to 44 mole % of HOOC-Ar'-COOH; (C) 15 to 45 mole % of HO-Ar"-OH; and (D) 1 to 45 mole % of a compound having the general structure:

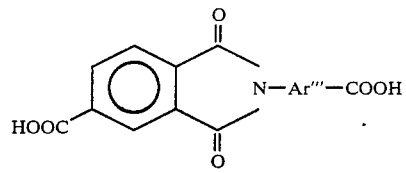

are readily processed, possess good mechanical properties and are useful for the production of molded articles.

14 Claims, No Drawings

MOLDING COMPOUNDS COMPRISING A THERMOPLASTICALLY PROCESSIBLE, AROMATIC POLYESTER IMIDE

BACKGROUND OF THE INVENTION

1. Field of the Invention

The present invention relates to molding compounds which contain a thermoplastically processible, aromatic polyester imide.

2. Discussion of Background

Liquid crystalline polyester imides are known. However, among other things, due to their inherent color and low crystallinity they are unsatisfactory. Thus, in DE-OS No. 29 50 939 polyester imides containing 4-(4'-carboxyphthalimido)benzoic acid, 2,6-naphthalenedicarboxylic acid and a chloro- or alkyl-substituted hydroquinone or 4-(4'hydroxyphthalimido)-phenol, 2,6-naphthalenedicarboxylic acid and a chloro- or alkyl-substituted terephthalic acid are described. Similarly, in U.S. Pat. No. 4,383,105, instead of naphthalenedicarboxylic acid, 6-hydroxy-2-naphthalenecarboxylic acid is added. However, these monomers are difficult to obtain, and thus, the polymers are uninteresting from an engineering point of view.

Polyester imides, which contain units of $C_8$- to $C_{16}$-alkylene-$\alpha,\omega$-bis(trimellitic acid imides) (DE-OS No. 35 16 427) or $C_2$- to $C_{12}$-alkylene-$\alpha,\omega$-bis(trimellitic acid imides) (EP-OS No. 0 213 362), do not exhibit the desired high thermal stability.

From DE-OS No. 35 42 857 and EP-OS No. 0 225 537 polyester imides are known that are derived from bis(trimellitic acid imides) of mononuclear or binuclear diamines.

Thus, there remains a need for aromatic polyester imides that are liquid crystalline, preferably in the melt, and that exhibit a combination of good melt flow properties, excellent impact and notch resistance, high rigidity, and high thermal stability. There is also a need for molding compounds based on such thermoplastically processible aromatic polyester imides.

SUMMARY OF THE INVENTION

Accordingly, one object of the present invention is to provide novel aromatic polyester imides which are liquid crystalline, preferably in the melt, and that exhibit a combination of good melt flow properties, excellent impact and notch resistance, high rigidity, and high thermostability.

It is another object of the present invention to provide novel molding compounds which contain a thermoplastically processible, aromatic polyester imide which is preferably liquid crystalline in the melt, and that exhibits a combination of good melt flow properties, excellent impact and notch resistance, high rigidity, and high thermostability.

It is a further object of the present invention to provide molding compounds which afford molded products that are non-flammable and extremely chemical resistant.

These and other objects which will become apparent during the course of the following detailed description have been achieved by polyester imides that are prepared by polymerizing the following starting materials:

(A) from 0 to 70 mole % of HO—Ar—COOH and derivatives thereof;

(B) from 0 to 44 mole % of HOOC—Ar'—COOH and derivatives thereof;

(C) from 15 to 45 mole % of HO—Ar"—OH and derivatives thereof; and (D) from 1 to 45 mole % of a compound having the general structure:

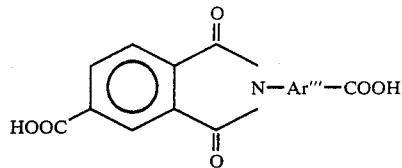

and derivatives thereof. In the formulas given above, Ar is 1,3- or 1,4-phenylene; Ar' and Ar" are 1,3- or 1,4-phenylene or,

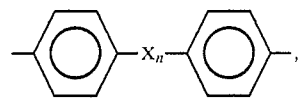

and Ar' and Ar" can be the same or can be 1,3- or 1,4-phenylene; X is —O—, —S—, —SO$_2$—, —CR$_2$—, —CO—; R is —H, C$_1$- to C$_4$-alkyl; and n is 0 or 1. All quantities are based on the sum of materials (A) to (D); the total mole % for (A) to (D) must equal 100 mole %; and the molar ratio of [(B)+(D)]:(C) ranges from 0.9:1 to 1.1:1.

DETAILED DESCRIPTION OF THE PREFERRED EMBODIMENTS

Suitable aromatic hydroxycarboxylic acids for (A) are p-hydroxybenzoic acid and m-hydroxybenzoic acid, and p-hydroxybenzoic acid is preferred.

Suitable aromatic dicarboxylic acids for (B) include isophthalic acid, terephthalic acid, 4,4'-diphenyletherdicarboxylic acid, 4,4'-benzophenonedicarboxylic acid, 4,4'-diphenylsulfonedicarboxylic acid, and mixtures thereof. Preferred compounds for (B) are isophthalic acid, terephthalic acid, and mixtures thereof.

Suitable aromatic dihydroxy compounds for (C) are hydroquinone, resorcinol, 4,4'-dihydroxybiphenyl, 4,4'-dihydroxydiphenyl ether, 4,4'-dihydroxydiphenylsulfone, 4,4'-dihydroxydiphenylsulfide, 4,4'-dihydroxybenzophenone, bisphenol A, and mixtures thereof. Hydroquinone and 4,4'-dihydroxybiphenyl are preferred.

Compounds for (D), having the general structure,

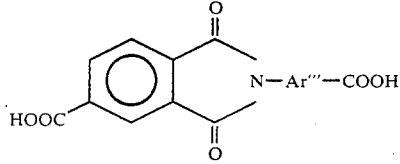

are imides, which can be derived from trimellitic acid anhydride and 3- or 4-aminobenzoic acid. They can be produced from these starting materials by any conventional method which is suitable for the formation of imides from acid anhydrides and amines. The preferred compound for (D) is 4-(4'-carboxyphthalimido)benzoic acid.

Material (A) is added in quantities ranging from 0 to 70 mole %, preferably from 10 to 50 mole %, and (B) is added in quantities ranging from 0 to 44 mole %, preferably from 10 to 35 mole %. The amount of (C) ranges from 15 to 45 mole %, preferably from 20 to 40 mole %, and the amount of (D) ranges from 1 to 45 mole %, preferably from 3 to 30 mole %. The molar ratio of [(B)+(D)]:(C) ranges from 0.9:1 to 1.1:1, preferably from 0.96:1 to 1.04:1. The amounts of the individual materials are based on the sum of the amounts of (A) to (D), and their sum must yield 100 mole %.

Preferred polyester imides are those in which (D) is present in an amount of from 3 to 60 mole % based on the sum of (B) and (D). Particularly preferred polyester imides contain from 8 to 40 mole % of (D) based on the sum of (B) and (D).

Any conventional polymerization method that can be used for the preparation of aromatic polyesters can be used to prepare the present polyester imides (see, e.g., U.S. Pat. No. 4,093,595, DE-OS No. 20 25 971, EP-OS No. 0 050 821, and U.S. Pat. No. 4,184,996). The starting materials can be added with their free end groups or also as derivatives, e.g. with an ester, acid chloride, or acyloxy group. The starting materials can be polymerized in the melt; however, the reaction can also be conducted in the presence of an inert heat exchanger, whereby the product precipitates in the suspension. In general, (A) and (C) are added as acetates or bisacetates, and (B) and (D) are added as free dicarboxylic acids. When the free bisphenols or hydroxycarboxylic acids are added, the acetates or bisacetates can be prepared in situ through preliminary reaction with acetic anhydride. When derivatives of the starting materials are used, the mole % for each material is based on the molecular weight of the derivative.

The rate of polymerization can be increased by the addition of any conventional esterification catalyst (e.g., an alkali acetate, an alkaline earth acetate, zinc acetate; germanium dioxide, dialkyl tin oxide, titanium tetraalkoxides, or p-toluenesulfonic acid). The catalyst is present in approximately 0.001 to 1% by weight, preferably between 0.01 and 0.2% by weight, based on the sum of the monomers.

In addition, the molecular weight of the present polyester imides can, if necessary, be further increased by means of a solid phase post-condensation, whereby the comminuted polymer is held for several hours in an inert atmosphere (e.g. nitrogen or vacuum) at temperatures ranging from 160° to 320° C.

The polyester imides of the present invention have a glass transition temperature, $T_g$, of more than 130° C., preferably between 140° and 180° C., and, in such case, a crystallite melting point, $T_m$, of maximum 360° C. Those polyester imides that form a liquid crystalline melt at temperatures above $T_m$ (with amorphous polyester imides above $T_g$) are especially interesting. The viscosity of the solution should be at least 0.5 dl/g.

The present polyester imides can be processed into the molding compounds of the present invention by means of injection molding or extrusion using conventional machines.

The present molding compounds may also contain fillers such as talcum; reinforcers such as glass fibers, ARAMID ® or carbon fibers; and other conventional additives such as pigments or stabilizers.

The molding compounds of the present invention may be processed in accordance with any conventional process, such as injection moulding, extrusion, and the like into molded products, fibers, films, etc., and are useful for the production of molded articles. Similarly, it is also possible to use a powder, a liquid dispersion or a solution as a coating agent in, e.g., a dip coating process.

The molded products, manufactured from the molding compounds of the present invention, are characterized by a low melt viscosity under processing conditions, excellent impact and notch resistance, high rigidity, and high thermal stability. They are non-flammable and extremely chemical resistant.

EXAMPLES

The parameters cited in the specification and in the Examples were determined according to the following methods.

The reduced viscosity ($\eta_{red}$) was determined with a solution of the polymer (5 g/l) in phenol/odichlorobenzene (50/50 parts by weight) at 25° C. in compliance with DIN 53 728.

The glass point ($T_g$) and the melting point ($T_m$) were determined by differential scanning calorimetry (DSC) at a heating rate of 10° C./min.

The polarizing microscope examination for liquid crystalline properties was performed on a Leitz-Orthoplan-Pol-Microscope with 13-X magnification in connection with a FP 52 Mettler heating stage which was adapted to operate at temperatures up to 385° C. In this method, a striated texture with crossed polarizers indicates a liquid crystalline property.

EXAMPLE 1

9.97 g of isophthalic acid (30.77 mole %), 2.33 g of 4-(4'-carboxyphthalimido)benzoic acid (3.85 mole %), 11.77 g of hydroquinone diacetate (30.77 mole %), 2.03 g of 4,4'-diacetoxybiphenyl (3.85 mole %) and 10.81 g of 4-acetoxybenzoic acid (30.77 mole %) were stirred together with 36 mg of sodium acetate (0.1% by weight) first for 30 minutes at 260° C. and then for 3 minutes at 280° C., and then for 1 hour at 300° C., while the acetic acid that was formed was removed by means of distillation. Subsequently, the pressure was reduced to 20 mbar within 30 min, and simultaneously the temperature was raised to 320° C., then the mixture was stirred for 15 min at 320° C. and 20 mbar. The viscous thread-forming melt was then removed.

$\eta_{red}$: 1.18 dl/g; $T_m$: 340° C.; $T_g$: 142° C.

Polarizing microscope examination indicated liquid crystalline property ranging from above $T_m$ to the measuring limit of 385° C.

EXAMPLE 2

9.97 g of isophthalic acid (25.00 mole %)
9.32 g of 4-(4'-carboxyphthalimido)benzoic acid (12.50 mole %)
11.77 g of hydroquinone diacetate (25.00 mole %)
8.12 g of 4,4'-diacetoxybiphenyl (12.50 mole %)
10.81 g of 4-acetoxybenzoic acid (25.00 mole %)
49 mg of sodium acetate Example 2 was carried out analogously to Example 1.
$\eta_{rec}$: 1.32 dl/g; $T_m$ not measurable; $T_g$: 153° C.

Polarizing microscope examination indicated liquid climately 270° C. to the measuring limit of 385° C.

EXAMPLE 3

997.0 g of isophthalic acid (22.22 mole %), 466.0 g of 4-(4'-carboxyphthalimido)benzoic acid (5.56 mole 1177.0 g of hydroquinone diacetate (22.22 mole %), 406.0 g of 4,4'-diacetoxybiphenyl (5.56 mole %), 2162.0 g of 4-acetoxybenzoic acid (44.44 mole %) and 1.0 g of sodium acetate were stirred together first for 45 minutes at 260° C. and then for 45 min. at 270° C. while the acetic acid that was formed was removed by means of distillation, and then heated within 45 min. to 320° C. and then within 15 min. to 330° C. After the product was removed, said product was milled to the size of granules and post-condensed in the solid phase at approximately 2 to 5 mbar for 16 hours at 160° C., for 12 hours at 200° C., for 9 hours at 250° C., and for 10 hours at 300° C. The product (red 1.27 dl/g; $T_m$: not measurable; $T_g$: 137° C.) was extruded into test specimens at a temperature of 340° C. and a molding temperature of 70° C. The following properties were determined.

notch resistance (DIN 53 453); 23° C.: 8/8 beginning of breaking (42 kJ/m$_2$)

impact resistance (DIN 53 453); 23° C.: 8/8 beginning of (56 kJ/m$_2$)

tensile test according to DIN 53 455:

yield stress ($\delta_r$): 128 N/mm$^2$ elongation at break ($\epsilon_r$): 2.7% tensile E modulus (DIN 53 457): 16,150 N/mm$^2$ Polarizing microscope examination indicated liquid crystalline property ranging up to the measuring limit (385° C.).

All of the patents and references cited and discussed above are incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A molding compound comprising a thermoplastically processable, aromatic polyester imide prepared by polymerizing the following starting materials consisting essentially of:

(A) from 0 to 70 mole % of HO—Ar—COOH and derivatives thereof;

(B) from 0 to 44 mole % of HOOC—Ar'—COOH and derivatives thereof;

(C) from 15 to 45 mole % of HO—Ar"—OH and derivatives thereof; and (D) from 1 to 45 mole % of a compound having the general structure

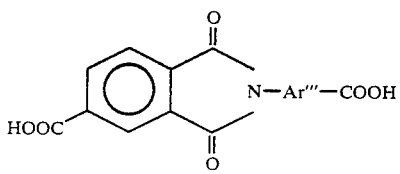

and derivatives thereof;

wherein Ar is selected from the group consisting of 1,3-phenylene and 1,4-phenylene; Ar' and Ar" are the same or different and are selected from the group consisting of 1,3-phenylene, 1,4-phenylene, and

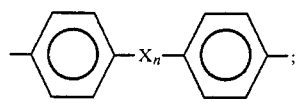

Ar'" is selected from the group consisting of 1,3-phenylene and 1,4-phenylene;

wherein

X is —O—, —S—, —SO$_2$—, or —CO—;

R is —H, C$_1$- to C$_4$-alkyl; and n is 0 or 1;

and wherein all amounts are based on the sum of the amounts of (A) to (D), and the sum of the amounts of (A) to (D) must equal 100 mole %; and wherein the molar ratio of [(B)+(D)]:(C) is from 0.9:1 to 1.1:1.

2. The molding compound of claim 1, wherein Ar is 1,4-phenylene.

3. The molding compound of claim 1, wherein Ar' is 1,3-phenylene, 1,4-phenylene, or a mixture thereof.

4. The molding compound of claim 1, wherein Ar" is 1,4-phenylene,

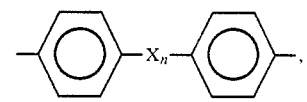

or a mixture thereof.

5. The molding compound of claim 1, wherein Ar'" is 1,4-phenylene.

6. The molding compound of claim 1, wherein said polyester imide is prepared by polymerizing material (D) in an amount of from 3–60 mole % of the sum of said materials (B) and (D).

7. The molding compound of claim 6, wherein said polyester imide is prepared by polymerizing said material (D) in an amount of from 8 to 40 mole % of the sum of said materials (B) and (D).

8. The molding compound of claim 1, further comprising one or more members selected from the group consisting of fillers, reinforcers, pigments, and stabilizers.

9. The molding compound of claim 8, wherein said reinforcer is one member selected from the group consisting of glass fibers, ARAMID ® fibers, and carbon fibers.

10. The molding compound of claim 1, wherein said aromatic polyester imide is prepared by polymerizing from 10 to 50 mole % of said material (A); from 10 to 35 mole % of said material (B); from 20 to 40 mole % of said material (C); and from 3 to 30 mole % of said material (D); and said molar ratio of [(B)+(D)]:(C) is from 0.96:1 to 1.04:1.

11. The molding compound of claim 1, wherein said polymerizing is conducted in the presence of a catalyst which is a member selected from the group consisting of an alkali acetate, an alkaline earth acetate, zinc acetate, germanium dioxide, dialkyl tin oxide, titanium tetraalkoxide, and p-toluenesulfonic acid.

12. The molding compound of claim 11, wherein said catalyst is present in an amount of from 0.001 to 1% by weight based on the total weight of said starting materials.

13. The molding compound of claim 12, wherein said catalyst is present in an amount of from 0.01 to 0.2% by weight based on the total weight of said starting materials.

14. The molding compound of claim 1, wherein said material (A) is an acetate, said material (B) is a free diacid, said material (C) is a bis(acetate), and said material (D) is a free diacid.

* * * * *